US012619704B2

(12) United States Patent
Goodman et al.

(10) Patent No.: US 12,619,704 B2
(45) Date of Patent: May 5, 2026

(54) ESTABLISHMENT OF SIGNING PIPELINES AND VALIDATION OF SIGNED SOFTWARE IMAGES

(71) Applicant: Dell Products L.P., Round Rock, TX (US)

(72) Inventors: Bradley K. Goodman, Nashua, NH (US); Joseph Caisse, Burlington, MA (US); Eric Joseph Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/326,384

(22) Filed: May 31, 2023

(65) Prior Publication Data

US 2024/0403407 A1     Dec. 5, 2024

(51) Int. Cl.
*G06F 21/44*          (2013.01)

(52) U.S. Cl.
CPC .................................... *G06F 21/44* (2013.01)

(58) Field of Classification Search
None
See application file for complete search history.

(56) References Cited

U.S. PATENT DOCUMENTS

| | | | |
|---|---|---|---|
| 11,431,510 B1 * | 8/2022 | Stapleton | H04L 9/3268 |
| 2010/0263060 A1 * | 10/2010 | Charbonneau | G06F 21/62 726/30 |
| 2017/0286665 A1 * | 10/2017 | Miranda | H04L 63/0823 |
| 2020/0374136 A1 * | 11/2020 | Momchilov | H04L 9/0819 |

OTHER PUBLICATIONS

Sun, Q. and Chang, S.F., 2005. A secure and robust digital signature scheme for JPEG2000 image authentication. IEEE Transactions on Multimedia, 7(3), pp. 480-494. (Year: 2005).*
Naveh, A. and Tromer, E., May 2016. Photoproof: Cryptographic image authentication for any set of permissible transformations. In 2016 IEEE Symposium on Security and Privacy (SP) (pp. 255-271). IEEE. (Year: 2016).*

* cited by examiner

*Primary Examiner* — Luu T Pham
*Assistant Examiner* — Edward X Long
(74) *Attorney, Agent, or Firm* — WOMBLE BOND DICKINSON (US) LLP

(57) ABSTRACT

Methods and systems for using signing pipelines to secure endpoint systems are disclosed. Endpoint systems may be secured using signed images that are signed by the signing pipelines. The signing pipelines may be based on validation rules implemented by the endpoint systems. The validation rules may be analyzed to identify how images must be signed based on the validation rules. The manner in which the images must be signed may be used to instantiate the signing pipeline.

20 Claims, 6 Drawing Sheets

ESTABLISHMENT OF SIGNING PIPELINES AND VALIDATION OF SIGNED SOFTWARE IMAGES

FIELD

Embodiments disclosed herein relate generally to validation. More particularly, embodiments disclosed herein relate to image validation.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
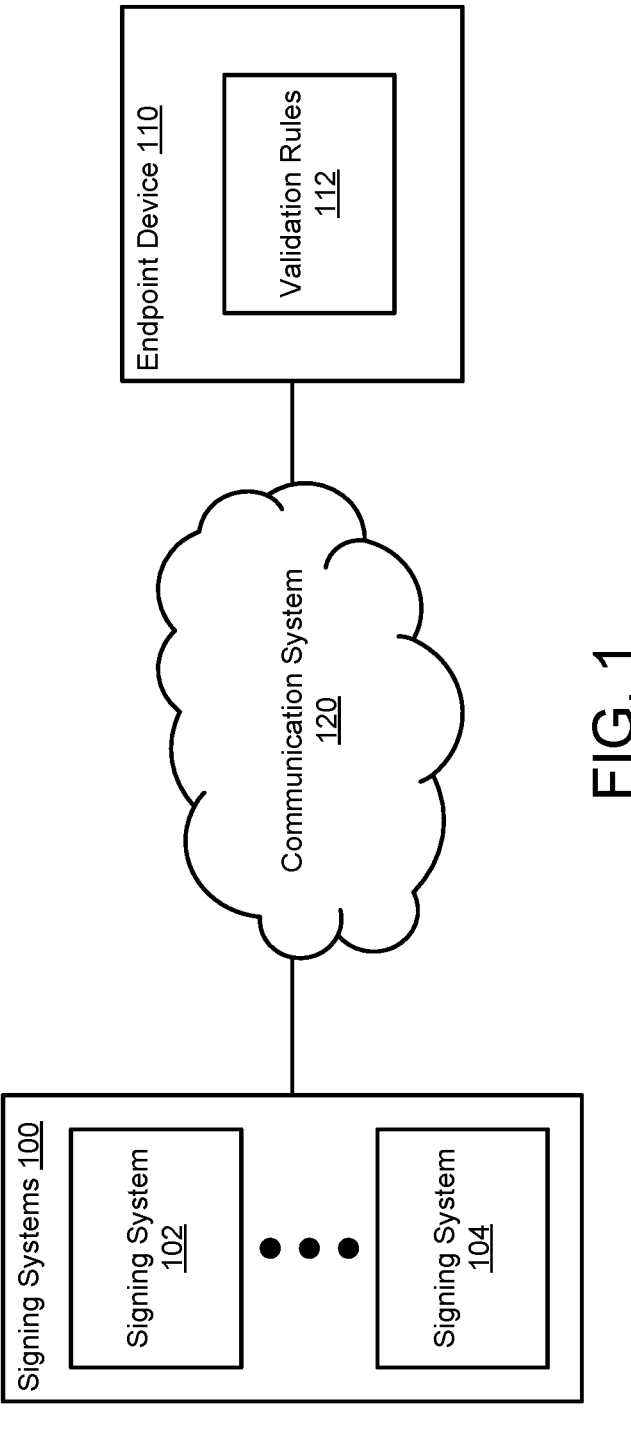
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for establishing signing pipelines usable to secure endpoint devices. The signing pipelines may be used to sign software images used by the endpoint devices. The endpoint devices may use the signatures from the signed software images to discriminate trustworthy from untrustworthy software.

To discriminate the trustworthy software images, the endpoint devices may use a set of validation rules that require a software image to be signed multiple times. The validation rules may also require that the signatures be applied by different signing systems and that the keys used for signing be associated with different entities that authorize use of the keys in the signing. By doing so, compromises of signing systems may be less likely to result in compromises of endpoint devices.

For example, to compromise an endpoint device, a malicious entity may be required to compromise multiple signing systems. Because the signing systems may be implemented by different organization with different security frameworks, compromise of multiple systems sufficient to sign software images maliciously may be unlikely.

To obtain the signed software images, the validation rules may be analyzed to obtain a signing pipeline description. The signing pipeline description may be used to configure multiple signing systems into a signing pipeline. The signing pipeline may allow software images to be signed multiple times and in accordance with the validation rules.

Thus, embodiments disclosed herein may address, among other technical problems, the technical problem of security in systems that rely on cryptographic verification such as signatures. Because signatures may only provide security when the keys and processes used in the signing remain secure, even a cryptographically signed data structure may still be untrustworthy. To address this technical problem, embodiments disclosed herein may facilitate multiple signing of data structures thereby improving the trustworthiness of the signed data structures.

In an embodiment, a method for managing secure execution of software images is provided. The method may include obtaining a software image of the software images; identifying validation rules for the software image; performing a signing analysis for the software image using the validation rules to obtain a signing pipeline description; instantiating a signing pipeline based on the signing pipeline description; and obtaining a signed copy of the software image using the signing pipeline.

The method may also include deploying the signed copy of the software image to an endpoint device that implements the validation rules; and initiating validation of the software image using the signed copy of the software image, the validation rules, and a trusted key repository to initiate secure execution of the software image by the endpoint device.

The validation rules for the software image may specify that the signed copy of the software be multiply signed with at least two different keys.

The validation rules for the software image may further specify that a first key of the at least two different keys be from a first pool of keys and a second key of the at least two different keys be from a second pool of keys.

The validation rules for the software image may further specify that the first pool of keys and the second pool of keys be any two different pools of keys of multiple pools of keys.

The first pool of keys may include keys associated with a first organization and the second pool of keys may include keys associated with a second organization.

The validation rules for the software image may further specify that software be multiply signed with two keys from a first pool of keys and two keys from a second pool of keys.

Performing the signing analysis may include identifying at least two organizations based on the validation rules. Instantiating the signing pipeline may include instructing, using the signing pipeline description, a first signing service managed by a first of the at least two organizations and a second signing service managed by a second of the at least two organizations to cooperatively sign the software image.

The signing pipeline description may specify options available to the first of the at least two organizations to sign the software image, the options being based on requirements of the validation rules.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may host applications that provide the computer implemented services. The applications may be use computing resources (e.g., processing resources, memory resources, etc.) of a host system to provide the computer implemented services.

To operate, the applications may expect that the host system be in a predetermined state of operation. The pre-determined state of operation may include, for example, hosting of an operating system, drivers, having specific configurations (hardware/software) in place, etc.

To enter the predetermined state, an endpoint device may perform a startup procedure. During the startup procedure, a specific sequence of different actions may be performed which may include, for example, conducting self-tests of devices, sequentially verifying and executing verified com-puter code, loading drivers/operating systems, and eventu-ally handing off management of the endpoint device to a management entity such as an operating system.

During the startup process, as noted above, computer code for various entities may be verified prior to execution. The computer code may be verified using public keys corre-sponding to private keys used to sign the code. The public keys may be stored in a database or other data structure, and in a verifiable format. By verifying the computer code prior to execution, the endpoint device may be more justified in trusting the authenticity of the computer code.

However, the authenticity of the data may depend on the manner in which the computer code (or any other type of data structure) is signed. If signed using a signing system that is compromised (e.g., due to a bug in the system, a compromised user of the system, etc.), then the signed computer code may not be reliable. Thus, if used during a startup and/or during normal operation of an endpoint device, the endpoint device may be compromised by use of the computer code.

In general, embodiments disclosed herein may provide methods, systems, and/or devices for securing endpoint devices through computer code validation prior to execution. To validate the computer code prior to execution, a validation rules for the computer code may be evaluated. The validation rules may require that the computer code be signed with one or more keys. For example, the validation rules may require that computer code must be signed with two private keys that are trusted by the endpoint device.

The validation rules may also require that the computer code be signed with keys that do not have any dependency between them, and provide flexibility in which specific keys and signing frameworks be used. For example, the valida-tion rules may require that multiply signed computer code be signed using (i) different signing frameworks managed by different organizations or groups, (ii) be signed using dif-ferent private keys, (iii) be signed using multiple signing frameworks and private keys from a range of different signing frameworks and private keys, (iv) be signed a number of times that is dependent on a number of available signing keys, and/or may include different, fewer, and/or additional requirements.

To manage software code signing, the system of FIG. 1 may instantiate a signing pipeline. The signing pipeline may be based on the validation rules that will be used to evaluate whether the computer code is authentic. Once instantiated, the signing pipeline may be used to sign computer code.

The signed computer code may be deployed for use by endpoint devices as part of their operation. For example, the signed computer code may be used during startup processes through which the endpoint devices may operate desired states of operation.

To provide the above noted functionality, the system of FIG. 1 may include any number of signing systems 100 and endpoint device 110. Each of these components is discussed below.

Figure 2A:
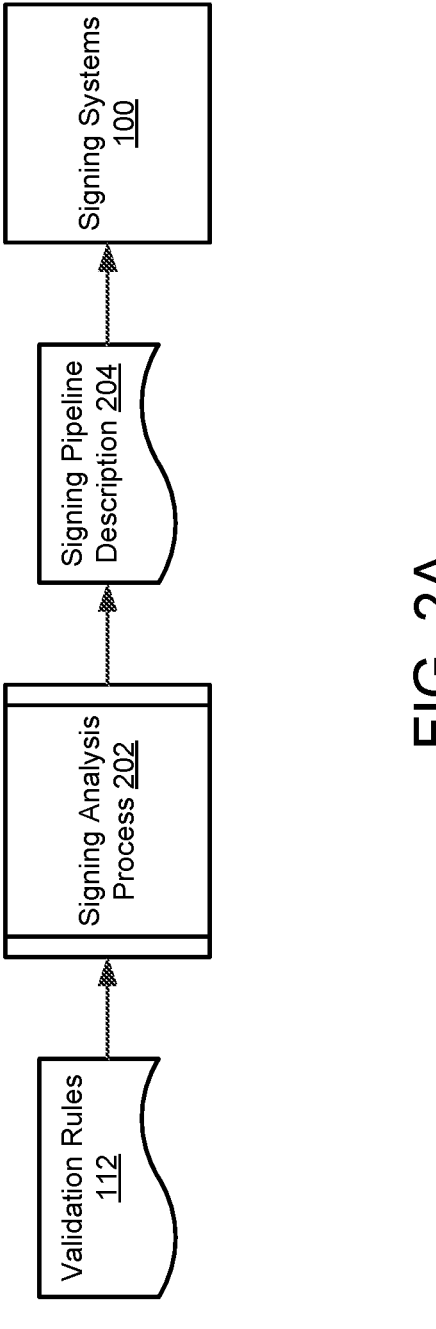
FIGS. 2A-2C show data flow diagrams in accordance with an embodiment.
Figure 2B:
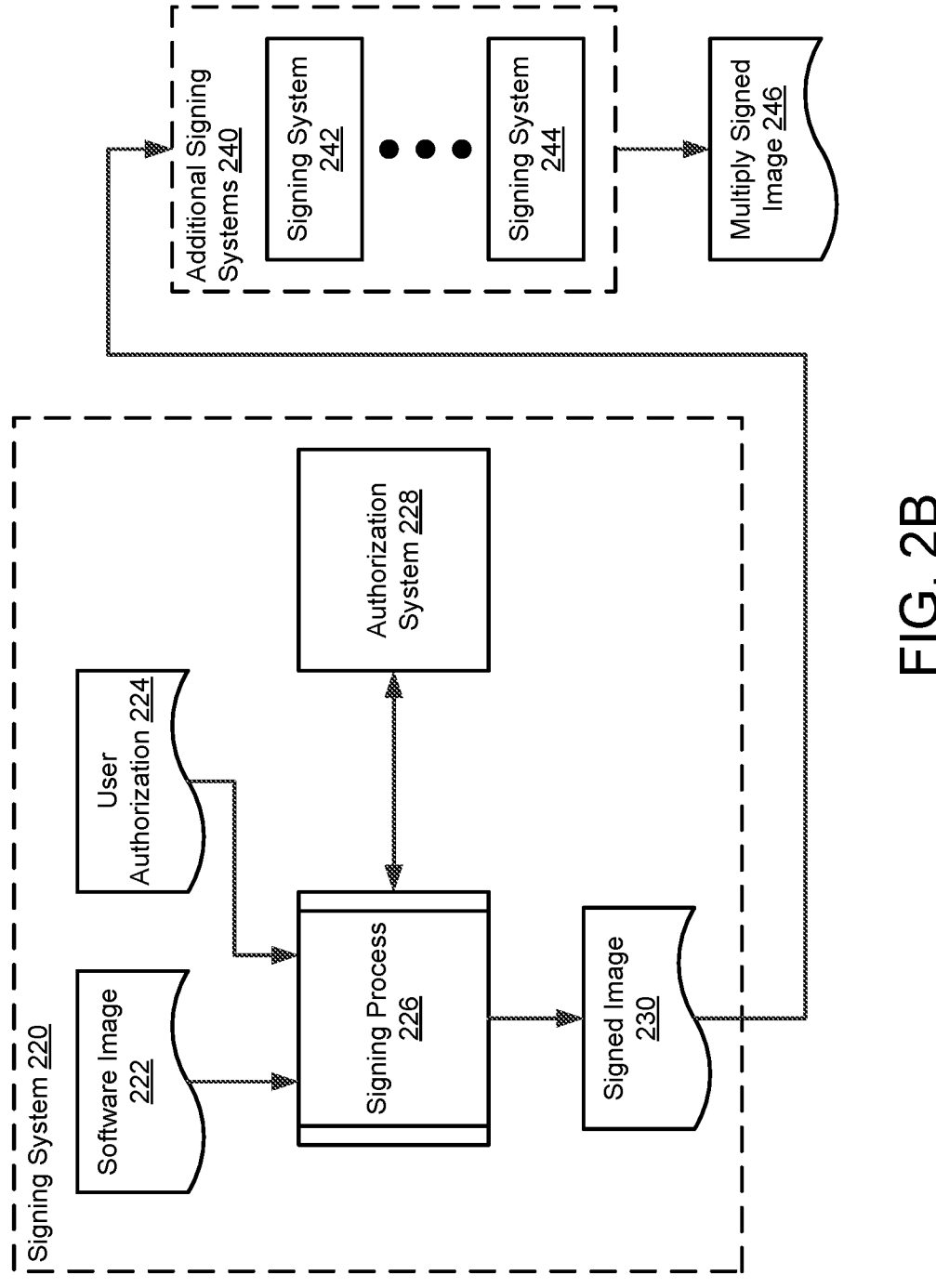

Signing systems 100 may be systems usable to sign computer code. To do so, each of signing systems 100 may include functionality to (i) establish portions of signing pipelines that are able to sign computer code in accordance with validation rules, and (ii) automatically forward signed computer code along signing pipelines. To establish the portions of the validation rules, any of the signing systems and/or other entities may analyze validation rules imple-mented by endpoint devices, and generate a description of a signing pipeline that is able to sign computer code in a manner that meets the requirements of the validation rules. The resulting signing pipeline may be used to multiply sign computer code. Refer to FIGS. 2A-2B for additional details regarding signing pipelines.

Figure 2C:
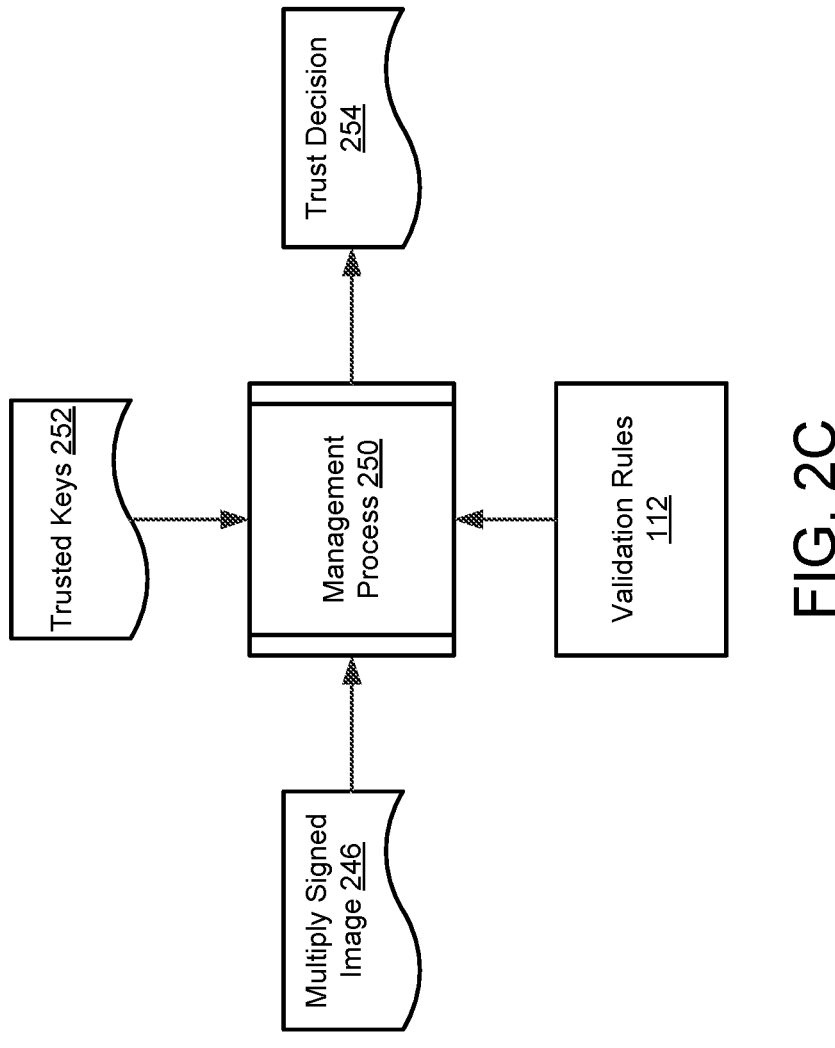

Endpoint device 110 may provide computer implemented services while in a predetermined operating state. To enter the predetermined operating state, endpoint devices 110 may (i) use validation rules 112 to validate computer code prior to execution of the computer code, (ii) when desirable (e.g., during startup processes), execute the verified computer code to enter the predetermined operating state, and (iii) provide the computer implemented services while in prede-termined operating state. Refer to FIG. 2C for additional details regarding using validation rules 112 to validate computer code prior to execution.

Figure 3:
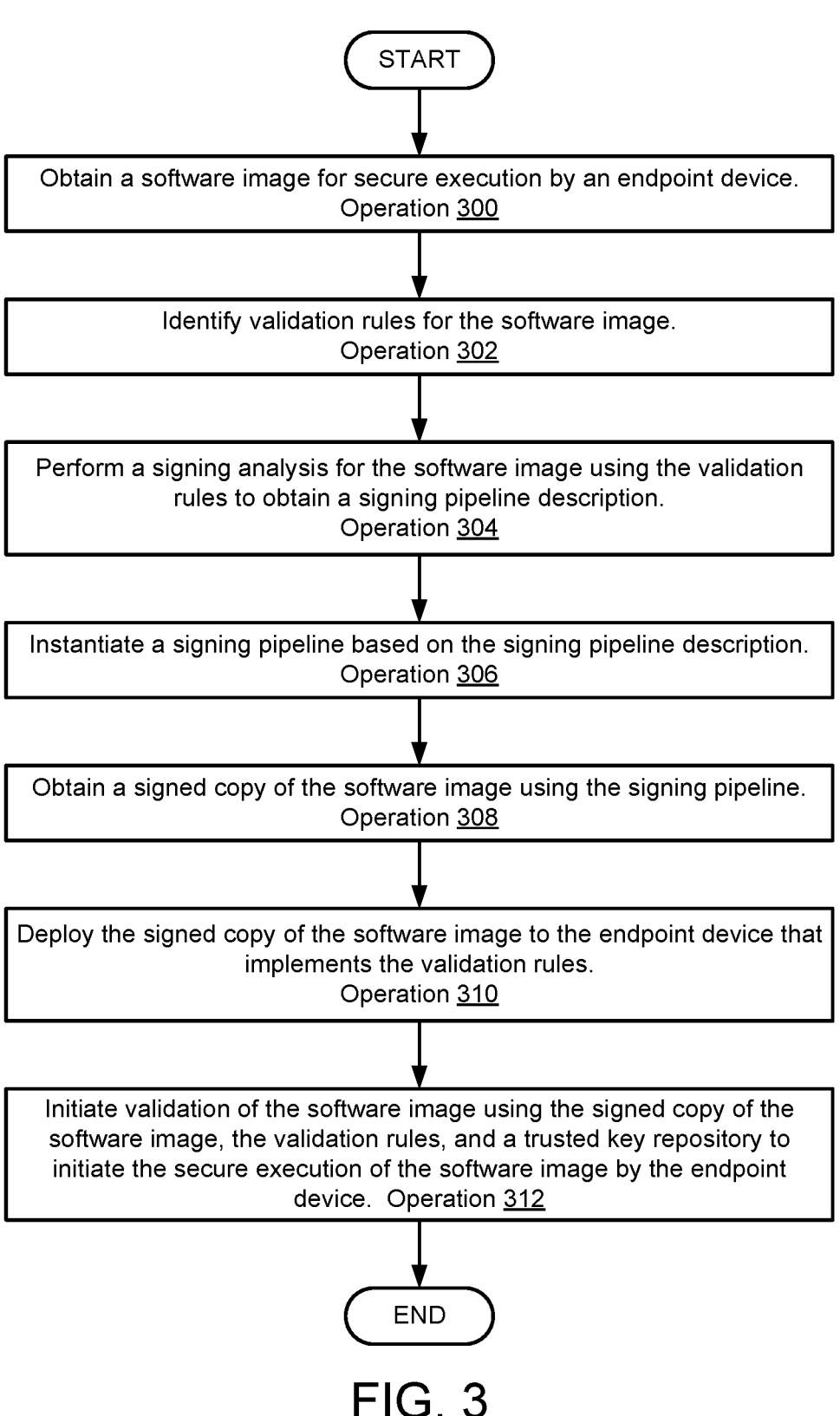
FIG. 3 shows a flow diagram illustrating a method in accordance with an embodiment.

When providing their functionality, any of (and/or com-ponents thereof) signing systems 100 and/or endpoint device 110 may perform all, or a portion, of the method illustrated in FIG. 3.

Any of (and/or components thereof) signing systems 100 and endpoint device 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

As discussed above, the system of FIG. 1 may facilitate signing of computer code using a signing pipeline based on validation rules.

Turning to FIG. 2A, a first data flow diagram in accordance with an embodiment is shown. To sign computer code in accordance with validation rules 112, a signing pipeline may be established using any number of signing systems (e.g., 102, 104).

To establish the signing pipeline, signing analysis process 202 may be performed. During signing analysis process 202, validation rules 112 may be ingested and analyzed to identify requirements for computer code to be trusted and executed by an endpoint device. The requirements may include, for example, (i) numbers of times the computer code may need to be signed, (ii) diversity of keys used to sign the computer code, and (iii) diversity of signing systems used to sign the computer code.

Based on these requirements, signing pipeline description 204 may be generated. Signing pipeline description 204 may be description of a signing pipeline that will generate signed computer code that will pass validation using the validation rules. Signing pipeline description 204 may be generated procedurally based on the requirements for the computer code, and/or via other methods.

Once obtained, signing pipeline description 204 and/or information based on it may be provided to signing systems 100. Signing systems 100 may ingest signing pipeline description 204 and conform at least part of its behavior to that specified by signing pipeline description 204. Refer to FIG. 2B for additional details regarding signing pipelines.

For example, signing systems from different organizations may receive copies of signing pipeline description 204. Based on the description, each portion of the signing pipeline may ingest the software image for signing. The keys used in the signing (and corresponding persons/entities that authorize the signings) may be specified by signing pipeline description 204.

Turning to FIG. 2B, a second data flow diagram in accordance with an embodiment is shown. The data flow shown in FIG. 2B may be used to multiply sign a software image in accordance with validation rules.

To multiple sign a software image, a signing pipeline that includes any number of signing systems (e.g., 220, 240) may be established. To establish each signing system, as discussed with respect to FIG. 2A, a signing pipeline description may be distributed to each of the signing systems that will participate in the pipeline.

Each signing system may use the signing pipeline description to identify how to sign an image, where signed images should be sent, etc. For example, when signing system 220 ingests the signing pipeline description, signing system 220 may identify (i) which users are required to authorize signing of the image, and (ii) that the signed image (e.g., 230) should be forwarded to additional signing systems 240, in this example scenario. Once identified, signing system 220 may implement signing process 226 based on the signing pipeline description.

During signing process 226, a software image (e.g., 222) may be signed. To sign the image, authorization for the signing may be sought from a user or entity indicated by the signing pipeline description. If the user authorizes signing of software image 222, user authorization 224 may be provided by the user. The user authorization may be validated by authorization system 228 (e.g., a centralized identity and access management system), and a hardware security module (not shown) may sign the software image on behalf of the user or entity without risking exposure of the private key. The resulting signed image 230 may be signed using a first private key using a first signing system that is independent of other signing systems and that provides signing services for different pools of users/entities that use distinct identity and access management systems and hardware security modules for security purposes.

In this example, signed image 230 may be forwarded to additional signing systems 240. Each of the additional signing systems (e.g., 242-244) may perform similar signing procedures resulting in multiply signed image 246. However, in each iteration of the signing, different users/entities may be required to authorize the signing, keys managed by different hardware security modules may be used in the signings, different identity and authorization management systems may be used to confirm authority of the persons/entities authorizing the signings, etc. Consequently, a compromise in any signing system or multiple signing systems may be less likely to compromise a signed image.

For example, by requiring that multiple signing systems sign a software image a malicious entity may need to compromise multiple signing systems to obtain signed software images that are able to pass validation rules implemented by endpoint devices. Accordingly, endpoint devices may be less likely to be able to be compromised by malicious entities through hijacking of signing systems to obtain signed malicious software images.

Once obtained, multiply signed image 246 may be distributed to endpoint devices for use in operation.

Turning to FIG. 2C, a third data flow diagram in accordance with an embodiment is shown. The data flow shown in FIG. 2C may be used to authenticate multiply signed images. The data flow shown in FIG. 2C may be performed, for example, during a startup process. During the startup process, a management entity such as firmware based on the Unified Extensible Firmware Interface (UEFI) specification.

During the startup process, various software images may be sequentially executed. Prior to execution, the software images may be checked to ascertain whether to trust each software image as part of a secure boot process.

For example, the management entity may perform management process 250.

During management process 250, multiply signed image 246 may be checked to ascertain whether it can be trusted and executed. To ascertain whether to trust multiply signed image 246, validation rules 112 may be evaluated to obtain trust decision 254.

Validation rules 112 may, as discussed above, specify any number of requirements that must be met for an image to be trusted. The requirements may specify (i) a number of signatures that must be verifiable using keys of trusted keys 252, (ii) diversity for the keys from trusted keys 252 used to verify the number of signatures.

For example, trusted keys 252 may be divided into groups. Each group may include public keys from public private key pairs used by different signing systems to sign software images. In this example, validation rules 112 may specify that (i) a first number of signatures of multiply signed image 246 must be verifiable using public keys from a first group of keys in trusted keys 252, and (ii) a second number of signatures of multiply signed image 246 must be verifiable using public keys from a second group of keys in trusted keys 252. If met, then multiply signed image 246 may be trusted.

It will be appreciated that the requirements specified by validation rules 112 may include any number and type.

In an embodiment, validation rules 112 require that at least one key from each group of keys of trusted keys 252 be used to validate a signature of multiply signed image 246.

In an embodiment, validation rules 112 require that at least two keys from each group of keys of trusted keys 252 be used to validate a signature of multiply signed image 246.

In an embodiment, validation rules 112 require that at least one key from at least two groups of keys of trusted keys 252 be used to validate a signature of multiply signed image 246.

In an embodiment, validation rules 112 require that at least one two keys from at least two groups of keys of trusted keys 252 be used to validate a signature of multiply signed image 246.

Trusted keys 252 may include any number of groups. The groups may include a same number or larger number of groups as required by validation rules 112.

Each group may include one or multiple keys. Each group may include a same number or a larger number of keys as required by validation rules 112.

Trusted keys 252 may be implemented as a database or other type of data structure. The startup process of an endpoint device include a step to verify the integrity of trusted keys 252 during the startup process. For example, trusted keys 252 may be signed using a key for a root of trust of the endpoint device, which may be used to verify the integrity of trusted keys 252 during the startup process. If trusted keys 252 cannot be verified, then the startup may be aborted, paused, and/or otherwise prevented from being completed by virtue of the software images used in the startup not being able to be verified because no verified keys may be available to perform the validations.

Any of the processes (e.g., 202, 226, 250) shown in FIGS. 2A-2C may be implemented using hardware and/or software components. For example, any of the processes may be implemented using software instructions executed by processing devices. Similarly, any of the processes may be implemented using special purposes and/or programmable hardware devices such as application specific integrated circuits, digital signal processors, etc.

As discussed above, the components of FIG. 1 may perform various methods to secure endpoint devices. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing secure operation of endpoint devices in accordance with an embodiment is shown. The method may be performed by any of signing systems 100, endpoint device 110, and/or other components of the system shown in FIG. 1.

At operation 300, a software image for execution by an endpoint device is obtained. The software image may allow any type of computer implemented service to be performed by the endpoint device.

At operation 302, validation rules for the software image are identified. The validation rules may be identified by (i) reading the validation rules from storage, (ii) receiving the validation rules from another device, (iii) obtaining user input indicating the validation rules, and/or via other methods.

The validation rules, as noted above, may specify that a software image be signed using certain numbers and types of keys. The validation rules may provide flexibility in that specific keys may not be required but may rather keys from groups of keys may be required by the validation rules. The validation rules may provide redundancy in that there may be multiple, alternative keys for one or more of the keys required by the validation rules. The pools of keys may be divided based on, for example, signing systems which may utilize the keys, entities associated with the keys, and/or other criteria to limit the impact of compromise of any of the keys. Refer to the discussion of FIGS. 2A-2C for additional details regarding validation rules.

At operation 304, a signing analysis of the software image using the validation rules is performed to obtain a signing pipeline description. The signing analysis may include (i) identifying numbers and types of signatures required, and (ii) identifying signing systems that have access to the keys required to instantiate the signatures. The signing pipeline description may be obtained by adding information regarding the numbers and types of signatures required, signing systems that may facilitate signing of the software images to obtain the required signatures, and an ordering of signing.

At operation 306, a signing pipeline is instantiated based on the signing pipeline description. The signing pipeline may be instantiated by sending a copy of the signing pipeline description to each of the identified signing systems. Each signing system may interpret the signing pipeline description and conform at least a portion of its behavior to the description.

For example, a signing system may use the signing pipeline description to identify the entities that will need to participate in its portion of the signing process, solicit signatures (or authorization for signatures to be added) from those entities during signing of software images, and establish forwarding procedures for signed software images to continue the flow of software images through the signing pipeline.

At operation 308, a signed copy of the software image is obtained using the signing pipeline. The signed copy of the software image may be obtained by sending a copy of the software image to a first signing system in the pipeline as defined by the signing pipeline description. The signing pipeline may automatically sign the software image (presuming that all entities for which signing authorization is required agree that to signing of the software image), or reject the software image for signing.

At operation 310, the signed copy of the software image is deployed to the endpoint device. The endpoint device may implement the validation rules discussed with respect to operation 302. The signed copy of the software image may be deployed by, for example, sending a copy of the signed software image to the endpoint device, using an update framework (or other type of framework) to transfer the signed software image to the endpoint device, and/or via other methods.

Deploying the signed copy of the software image may automatically initiate future attempts to use the software image. For example, the signed copy of the software image may be automatically used during startup processes performed by the endpoint device.

At operation 312, validation of the signed software image is initiated. The validation may use the validation rules, and a trusted key repository. For example, once deployed to the endpoint device, security frameworks used in operation of the endpoint device (e.g., startup processes) may automatically use the validation rules to validate the signed software image prior to use of the signed software image.

The signed software image may be validated by determining whether the signed software image meets the requirements of the validation rules. Keys from the trusted key repository (e.g., an extensible firmware interface database) may be used to attempt to verify the signatures of the signed software image. If the signatures can be verified using the keys from the trusted key repository, and the keys that can verify the signatures meet the validation rules, then the signed software image may be considered to have been validated.

If successfully validated, then the endpoint device may automatically use the software image by, for example, initiating execution of one or more processes based on the software image. Otherwise, the software image may be barred from execution by the endpoint device.

The method may end following operation 312.

Thus, using the method illustrated in FIG. 3, embodiments disclosed herein may facilitate deployment of signing pipelines based on validation rules to obtain multiply signed software images that meet the requirements of the validation rules. The multiply signed software images may be deployed to endpoint systems which may use the validation rules to discriminate trustworthy software images from untrustworthy software images.

Figure 4:
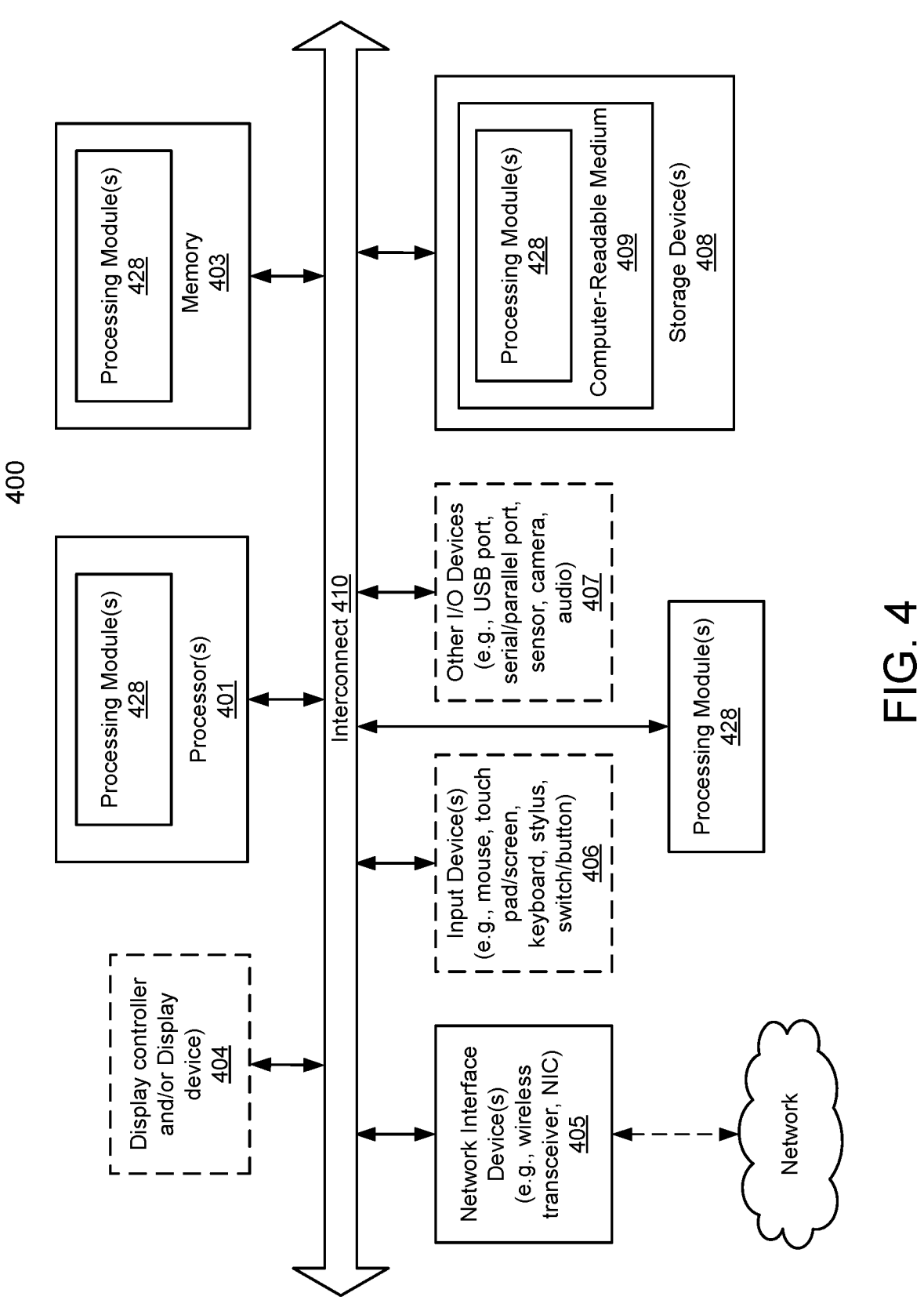
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing secure execution of software images, the method comprising:

obtaining a software image of the software images;

identifying, prior to obtaining a multiply signed copy of the software image, validation rules for the software image, the validation rules specifying:

at least two groups of entities and that the multiply signed copy of the software image be signed by one member of each of the at least two groups, that at least one of the at least two groups has at least two members so that alternative authorized signingusers for the multiply signed copy of the software image are available, a number of keys required for signing of the multiply signed copy of the software image where each of the keys are associated with at least one of the at least two groups and each of the keys are used to sign an entirety of the software image, a key type for each of the keys, a dependency requirement between the keys, and one or more alternative keys for each of the keys in case any of the keys are unavailable in signing systems of the at least two groups;

performing a signing analysis for the software image using the validation rules to obtain a signing pipeline description;

instantiating a signing pipeline based on the signing pipeline description to cause, at a start of the signing pipeline, the software image to be transmitted to and multiply signed by a portion of the entities, all of the entities among the portion of the entities apply different security frameworks from one another;

receiving, at an end of the signing pipeline, the multiply signed copy of the software image from at least one of the entities;

deploying the multiply signed copy of the software image to an endpoint device that implements the validation rules; and initiating validation of the software image using the multiply signed copy of the software image, the validation rules, and a trusted key repository to initiate secure execution of the software image by the endpoint device.

2. The method of claim 1, wherein the validation rules for the software image specify that a signed copy of the software image be multiply signed with at least two different keys associated with the at least two groups, the two differentkeys being part of the number of keys specified in the validation rules.

3. The method of claim 2, wherein the validation rules for the software image further specify that a first key of the at least two different keys be from a first pool of keys associated with a first group of the at least two groups and a second key of the at least two different keys be from a second pool of keys associated with a second group of the at least two groups.

4. The method of claim 3, wherein the first pool of keys comprises keys associated with a first organization and the second pool of keys comprises keys associated with a second organization, the first organization and the second organization being ones of the entities.

5. The method of claim 1, wherein the validation rules for the software image further specify that software be multiply signed with two keys from a first pool of keys and two keys from a second pool of keys.

6. The method of claim 1, wherein performing the signing analysis comprises:

identifying at least two organizations based on the validation rules, wherein instantiating the signing pipeline comprises:

instructing, using the signing pipeline description, a first signing service managed by a first of the at leasttwo organizations and a second signing service managed by a second of the at least two organizations to cooperatively sign the software image, the at least two organizations being ones of the entities.

7. A non-transitory machine-readable medium having instructions stored therein, which when executed by at least one processor, cause a data processing system to perform operations for managing secure execution of software images, the operations comprising:

obtaining a software image of the software images;

identifying, prior to obtaining a multiply signed copy of the software image, validation rules for the software image, the validation rules specifying:

at least two groups of entities and that the multiply signed copy of the software image be signed by one member of each of the at least two groups, that at least one of the at least two groups has at least two members so that alternative authorized signing users for the multiply signed copy of the software image are available, a number of keys required for signing of the multiply signed copy of the software image where each of the keys are associated with at least one of the at least two groups and each of the keys are used to sign an entirety of the software image, a key type for each of the keys, a dependency requirement between the keys, and one or more alternative keys for each of the keys in case any of the keys are unavailable in signing systems of the at least two groups;

performing a signing analysis for the software image using the validation rules to obtain a signing pipeline description;

instantiating a signing pipeline based on the signing pipeline description to cause, at a start of the signing pipeline, the software image to be transmitted to and multiply signed by a portion of the entities, all of the entities among the portion of the entities apply different security frameworks from one another different security frameworks from one another;

receiving, at an end of the signing pipeline, the multiply signed copy of the software image from at least one of the entities;

deploying the multiply signed copy of the software image to an endpoint device that implements the validation rules; and initiating validation of the software image using the multiply signed copy of the software image, the validation rules, and a trusted key repository to initiate secure execution of the software image by the endpoint device.

8. The non-transitory machine-readable medium of claim 7, wherein the validation rules for the software image specify that a signed copy of the software image be multiply signed with at least two different keys associated with the entities.

9. The non-transitory machine-readable medium of claim 8, wherein the validation rules for the software image further specify that a first key of the at least two different keys be from a first pool of keys and a second key of the at least two different keys be from a second pool of keys.

10. The non-transitory machine-readable medium of claim 9, wherein the validation rules for the software image further specify that the first pool of keys and the second pool of keys be any two different pools of keys of multiple pools of keys.

11. The non-transitory machine-readable medium of claim 9, wherein the first pool of keys comprises keys associated with a first organization and the second pool of keys comprises keys associated with a second organization, the first organization and the second organization being ones of the entities.

12. The non-transitory machine-readable medium of claim 7, wherein the validation rules for the software image further specify that software be multiply signed with two keys from a first pool of keys and two keys from a second pool of keys.

13. The non-transitory machine-readable medium of claim 7, wherein performing the signing analysis comprises:

identifying at least two organizations based on the validation rules, wherein instantiating the signing pipeline comprises:

instructing, using the signing pipeline description, a first signing service managed by a first of the at least two organizations and a second signing service managed by a second of the at least two organizations to cooperatively sign the software image, the at least two organizations being ones of the entities.

14. A data processing system, comprising:

at least one processor; and a memory coupled to the processor to store instructions, which when executed by the processor, cause the data processing system to perform operations for managing secure execution of software images, the operations comprising:

obtaining a software image of the software images;

identifying, prior to obtaining a multiply signed copy of the software image, validation rules for the software image, the validation rules specifying:

at least two groups of entities and that the multiply signed copy of the software image be signed by one member of each of the at least two groups, that at least one of the at least two groups has at least two members so that alternative authorized signing users for the multiply signed copy of the software image are available, a number of keys required for signing of the multiply signed copy of the software image where each of the keys are associated with at least one of the at least two groups and each of the keys are used to sign an entirety of the software image, a key type for each of the keys, a dependency requirement between the keys, and one or more alternative keys for each of the keys in case any of the keys are unavailable in signing systems of the at least two groups;

performing a signing analysis for the software image using the validation rules to obtain a signing pipeline description;

instantiating a signing pipeline based on the signing pipeline description to cause, at a start of the signing pipeline, the software image to be transmitted to and multiply signed by a portion of the entities, all of the entities among the portion of the entities apply different security frameworks from one another applying different security frameworks from one another;

receiving, at an end of the signing pipeline, the multiply signed copy of the software image from at least one of the entities;

deploying the multiply signed copy of the software image to an endpoint device that implements the validation rules; and initiating validation of the software image using the multiply signed copy of the software image, the validation rules, and a trusted key repository to initiate secure execution of the software image by the endpoint device.

15. The method of claim 1, wherein the multiply signed copy of the software image can only be validated using one or more trusted keys stored in a trusted key repository that is accessible to an endpoint device to which the multiply signed copy of the software image is to be deployed and executed, and all of the one or more trusted keys are further signed using a different key that is associated with a root of trust of the endpoint device and that is not among the one or more trusted keys stored within the trusted key repository.

16. The method of claim 1, wherein the software image is transmitted to the entities along with the signing pipeline description, and each of the entities use the signing pipeline description to at least determine where the software image should be transmitted next after each of the entities has signed the software image.

17. The method of claim 15, wherein the signing systems of the at least two groups comprise a first signing system of a first group of the at least two groups and a second signing system of a second group of the at least two groups, the first signing system and the second signing system operate independently of one another and each comprises differently configured identity and access management systems and hardware modules for security, and the identity and access management systems of each of the first signing system and the second signing system store and sign the multiply signed copy of the software image on behalf of each the authorized signing users without any of the authorized signing users having access to the keys used for the signing.

18. The data processing system of claim 14, wherein the validation rules for the software image specify that a signed copy of the software image be multiply signed with at least two different keys associated with the entities.

19. The data processing system of claim 18, wherein the validation rules for the software image further specify that a first key of the at least two different keys be from a first pool of keys and a second key of the at least two different keys be from a second pool of keys.

20. The data processing system of claim 19, wherein the validation rules for the software image further specify that the first pool of keys and the second pool of keys be any two different pools of keys of multiple pools of keys.

\* \* \* \* \*